(12) United States Patent
Sumiyoshi et al.

(10) Patent No.: US 6,339,425 B1
(45) Date of Patent: Jan. 15, 2002

(54) DIAL MODELING DEVICE AND METHOD

(75) Inventors: Kenjiro Sumiyoshi; Takahiro Shikakura, both of Saitama (JP)

(73) Assignees: Kansei Corporation; Advance Co., Ltd., both of Saitama (JP)

( * ) Notice: Subject to any disclaimer, the term of this patent is extended or adjusted under 35 U.S.C. 154(b) by 0 days.

(21) Appl. No.: 09/334,567

(22) Filed: Jun. 21, 1999

(30) Foreign Application Priority Data

Jun. 22, 1998 (JP) .......................................... 10-211728

(51) Int. Cl.[7] .............................................. G06F 15/00
(52) U.S. Cl. ...................................................... 345/426
(58) Field of Search ................... 345/426, 427, 345/621, 622, 625, 664, 665

(56) References Cited

U.S. PATENT DOCUMENTS 6,222,937 B1 * 4/2001 Cohen et al. ............... 382/154
6,292,194 B1 * 9/2001 Powell, III .................. 345/430

* cited by examiner

Primary Examiner—Phu K. Nguyen
(74) Attorney, Agent, or Firm—Sughrue Mion, PLLC

(57) ABSTRACT

A dial modeling device includes a three-dimensional model producing section for individually producing the three-dimensional model of plural indicators forming a dial, a rendering section for respectively projecting the data of the three-dimensional model of each indicator acquired in the three-dimensional model producing section on a two-dimensional plane, executing rendering by specifying a different light source every indicator and individually generating two-dimensional data for making each indicator look solid, an image storing section for storing the two-dimensional data generated in the rendering section of each indicator and an image synthesizing section for synthesizing the two-dimensional data of each indicator stored in the image storing section and the faced part of the dial.

2 Claims, 6 Drawing Sheets

DIAL MODELING DEVICE AND METHOD

BACKGROUND OF THE INVENTION

1. Field of the Invention

The present invention relates to a device and a method for modeling the dial of meters installed in an automobile and other facilities for example.

2. Description of the Related Art

For example, the dial of meters installed in an automobile is modeled by forming a transparent colored layer of light color such as white on one side of transparent or translucent flat base material by screen printing means and next forming a shading opaque printed layer of dark color where the contours of a graduation, a digit and others are removed on the surface of the above transparent colored layer by the above screen printing means so that in the daytime, the graduation, the digit and others formed on the dial are viewed by reflected light and at night, the above graduation, the above digit and others are viewed by light from a light source arranged on the back of the above dial.

In means for modeling the above dial, the above transparent colored layer and the opaque printed layer are formed by the screen printing means, however, as base material used by the screen printing means is required to be flat, screen printing on solid base material is difficult and it is difficult to model a solid dial which looks deep for example.

Then, it can be considered that to model a solid dial, a dial is made solid by press forming after a transparent colored layer and an opaque printed layer are formed by the above screen printing means, however, there is a problem that as press forming is further executed after screen printing, the manufacturing cost is increased.

In addition, there is a problem that when press forming is executed after screen printing, a flaw is readily made on a layer to which screen printing is applied and the quality of a dial is deteriorated.

Therefore, it is considered that a dial 1 which looks solid and is shown in FIG. 5 is modeled by producing the three-dimensional model of a dial by computer graphics, projecting the data of the acquired three-dimensional model 7 on a two-dimensional plane, executing rendering (coloring and shading a graduation, a digit, the background and others) by specifying a light source, generating two-dimensional data for making the dial look solid, directly outputting a printing original plate based upon the two-dimensional data and executing gradation printing using the printing original plate.

However, in gradation printing utilizing such computer graphics, as the whole dial 1, the side (the upper side in FIG. 6) close to a light source is light and the side (the lower side in FIG. 6) distant from the light source is dark because rendering is made using the one light source in case a dial 1 is a large-sized combination panel provided with the indicators 3 to 6 of plural meters such as a speed indicator, a tachometer, a fuel gage and a temperature gauge on a faced part 2 as shown in FIG. 6, there is a problem that the indicator 3 to 6 of each meter does not look solid uniformly and the dial 1 causes a sense of incompatibility.

SUMMARY OF THE INVENTION

An object of the present invention is to solve the above problems and to provide device and a method for modeling a dial by which a satisfactory sense of a solid can be created in the indicator of each meter in case the dial is a combination panel provided with the indicators of plural meters.

To solve the above problems, according to a first aspect of the present invention, there is provided a dial modeling device including: a three-dimensional model producing section for individually producing the three-dimensional model of plural indicators forming a dial; a rendering section for executing rendering by specifying a different light source for the three-dimensional model of each indicator acquired in the three-dimensional model producing section, respectively projecting the data of the three-dimensional model to which the rendering is applied on a two-dimensional plane and individually generating two-dimensional data for making each indicator look solid; an image storing section for storing the two-dimensional data of each indicator generated by the rendering section; and an image synthesizing section for synthesizing the two-dimension data of each indicator stored in the image storing section and a faced part forming a part of the dial.

According to the first aspect of the present invention, the three-dimensional model producing section individually produces the three-dimensional model of plural indicators forming a dial.

The rendering section executes rendering (coloring and shading a graduation, a digit, the background and others) by specifying a different light source for each indicator when the data of the three-dimensional model of each indicator acquired in the three-dimensional model producing section is projected on a two-dimensional plane and individually generates two-dimensional data for making each indicator look solid.

The two-dimensional data of each indicator generated by the rendering section is stored in the image storing section.

The image synthesizing section synthesizes the two-dimensional data of each indicator stored in the image storing section and the faced part of the dial.

Afterward, the output section directly outputs a printing original plate based upon the synthesized image acquired in the image synthesizing section and finally, the printing section executes gradation printing using the printing original plate output by the output section.

Hereby, the dial which satisfactorily looks solid is modeled.

As described above, as the three-dimensional model of each indicator is individually produced, rendering is executed using an individual light source and acquired two-dimensional data is synthesized in case the dial is a large-sized combination panel provided with plural indicators on the faced part, the dial which causes no sense of incompatibility and looks solid can be modeled even if the dial is the large-sized combination panel. In the case of the large-sized combination panel and others, a uniform dial which looks solid on the right and left sides of which difference in light and darkness is not large can be modeled.

Further, each indicator looks spotlighted to be a fine sight.

In addition, a solid sense of each indicator can be freely adjusted by changing and adjusting the position of a light source every indicator.

According to a second aspect of the present invention, there is provided a dial modeling method comprising the steps of: producing the three-dimensional model of plural indicators forming a dial individually; executing rendering by specifying a different light source for the acquired three-dimensional model of each indicator; projecting the data of the three-dimensional model to which the rendering is applied on a two-dimensional plane, respectively; generating two-dimensional data for making each indicator look solid individually; and synthesizing the acquired two-dimensional data of the indicator of each meter and a faced part forming a part of the dial.

According to the second aspect of the present invention, the similar action and effect to those in the first aspect of the invention can be acquired.

DESCRIPTION OF THE PREFERRED EMBODIMENT

Figure 1:
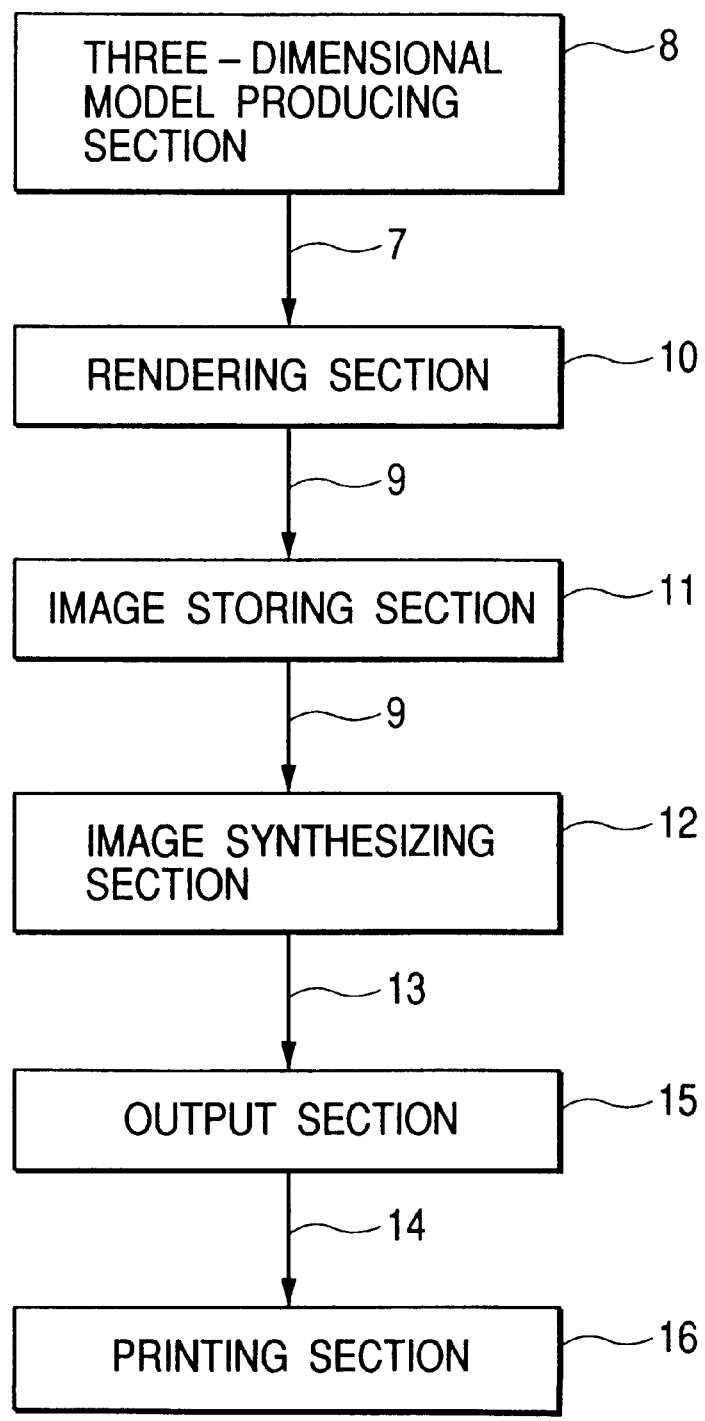
FIG. 1 is a flow sheet showing device used for a method disclosed in an embodiment 1 of the present invention.

Referring to the drawings, a specific embodiment 1 of the present invention will be described below.

FIGS. 1 to 4 show the embodiment 1 of the present invention. The same reference number is allocated to a part the same as or equivalent to that in the above conventional type.

First, the structure will be described. In this embodiment 1, a three-dimensional model producing section 8 for individually producing the three-dimensional model 7 of a faced part 2 and the respective indicators 3 to 6 of plural meters such as a speed indicator, a tachometer, a fuel gage and a temperature gauge respectively forming a dial 1 by computer graphics, a rendering section 10 for executing rendering (shading and coloring) by specifying a different light source for the three-dimensional model 7 of the faced part 2 and the indicator 3 to 6 of each meter respectively acquired in the three-dimensional model producing section 8, respectively projecting the data of the three-dimensional model to which the rendering processing is applied on a two-dimensional plane and individually generating two-dimensional data 9 for making each indicator look solid, an image storing section 11 for storing the two-dimensional data 9 of the faced part 2 and the indicator 3 to 6 of each meter respectively generated in the rendering section 10 and an image synthesizing section 12 for synthesizing the two-dimensional data 9 of the faced part 2 and the indicator 3 to 6 of each meter respectively stored in the image storing section 11 are provided.

An output section 15 for directly outputting a printing original plate 14 based upon a synthesized image 13 acquired in the image synthesizing section 12 is provided.

Further, a printing section 16 for executing gradation printing using the printing original plate 14 output from the output section 15 is provided.

Next, referring to the drawings, the action of the embodiment 1 will be described.

The three-dimensional model producing section 8 individually produces the three-dimensional model 7 of the faced part 2 and plural indicators such as a speed indicator, a tachometer, a fuel gage and a temperature gauge respectively forming the dial 1 by computer graphics.

Figure 2:
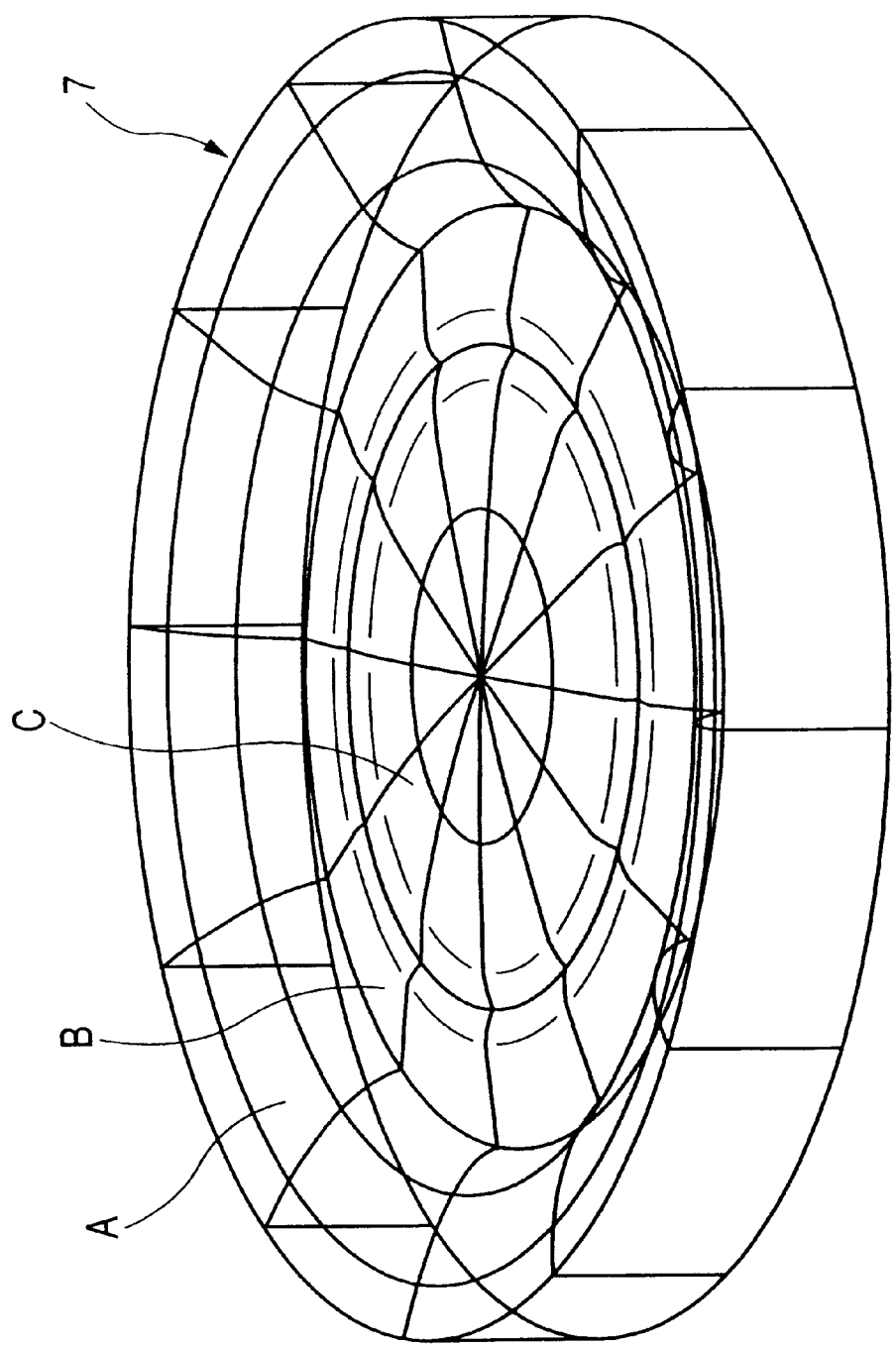
FIG. 2 is a perspective view showing the three-dimensional model of the indicator of each meter.

The three-dimensional model 7 is a disc shown in FIG. 2 for example and includes a peripheral area "a" relatively largely tilted for drawing a graduation, an intermediate area "b" relatively gradually tilted for drawing a digit and a central area "c" relatively flat for turning a pointer.

The rendering section 10 executes rendering (coloring and shading a graduation, a digit, the background and others) by specifying a different light source every the faced part 2 and the indicators 3 to 6 of each meter when the data of the three-dimensional model 7 acquired in the three-dimensional model producing section 8 of the faced part 2 and each meter is respectively projected on a two-dimensional plane and individually generates the two-dimensional data 9 for making each indicator look solid.

At this time, the two-dimensional data for enabling each indicator to look further solid can be generated by also considering conditions such as the intensity of light from a light source, the reflection characteristic of the material of the dial and the direction of the line of sight in addition to the position (the direction) of each light source.

The two-dimension data 9 generated in the rendering section 10 of the faced part 2 and the indicator 3 to 6 of each meter is stored in the image storing section 11.

Figure 3:
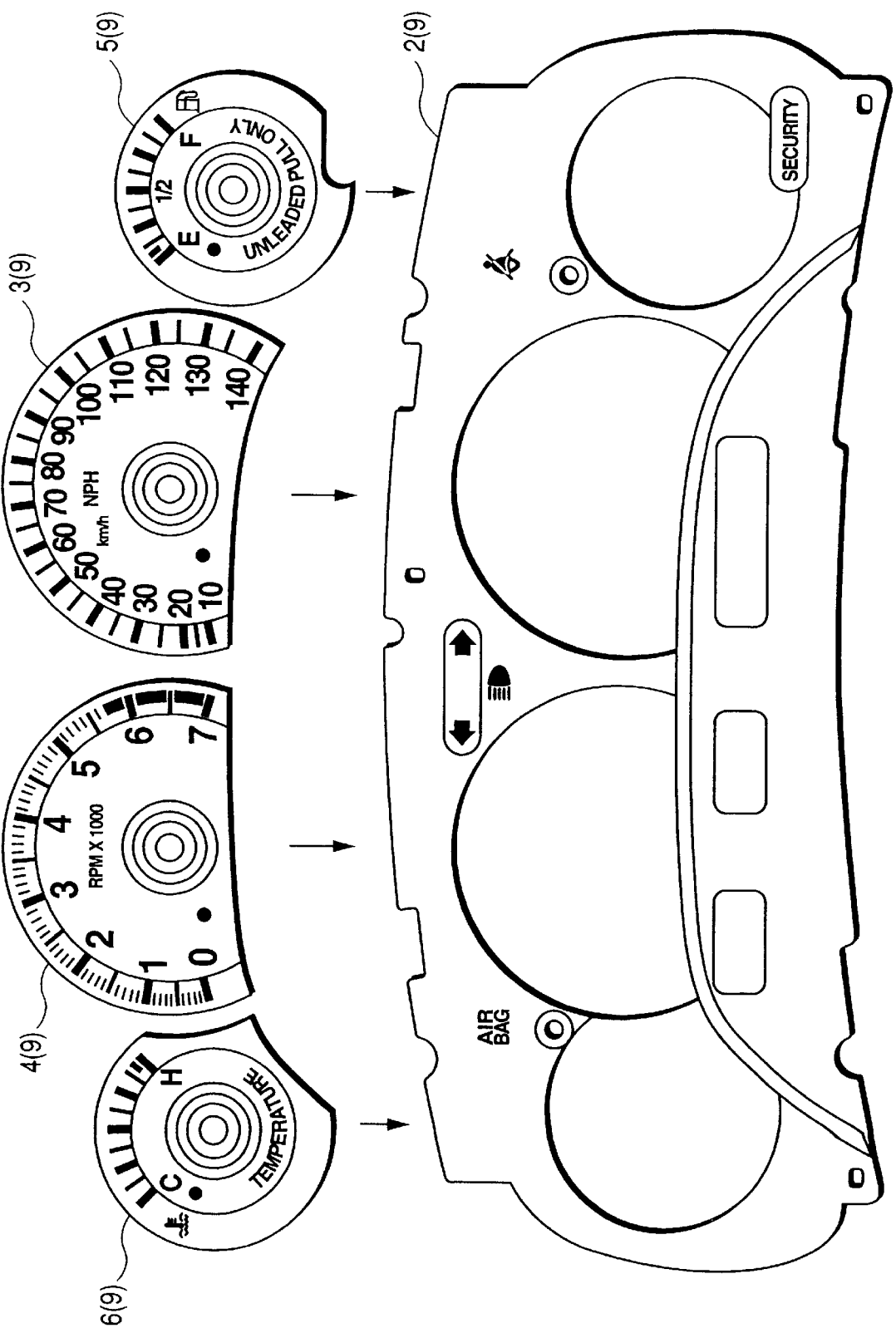
FIG. 3 is a front view showing appearance in which the two-dimensional data of the indicator of each meter is synthesized.

The image synthesizing section 12 synthesizes the two-dimension data 9 stored in the image storing section 11 of the faced part 2 and the indicator 3 to 6 of each meter as shown in FIG. 3.

The output section 15 directly outputs the printing original plate 14 based upon a synthesized image 13 acquired in the image synthesizing section 12.

Finally, the printing section 16 executes gradation printing using the printing original plate 14 output from the output section 15.

Figure 4:
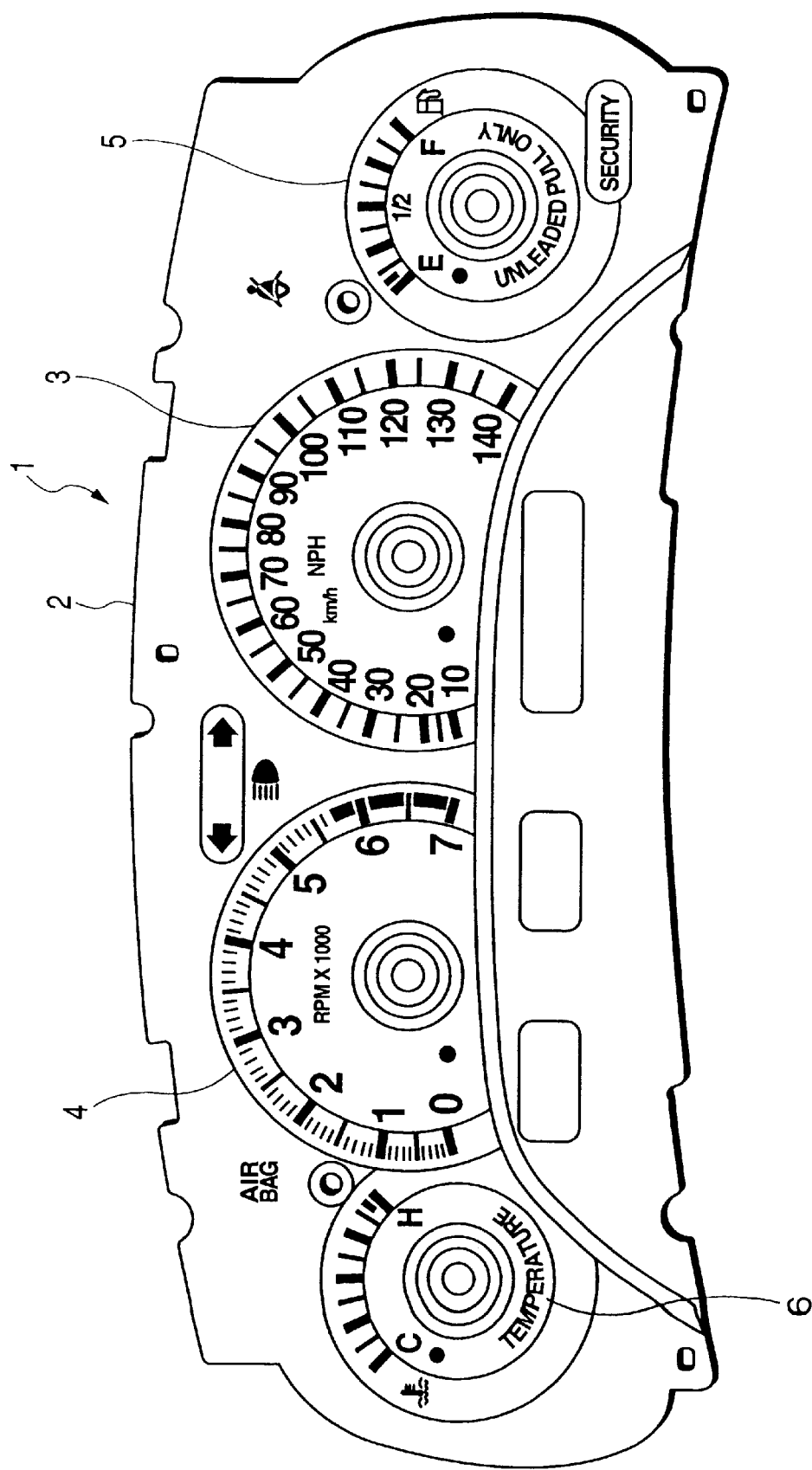
FIG. 4 is a front view showing a dial acquired by the method according to the present invention.
Figure 5:
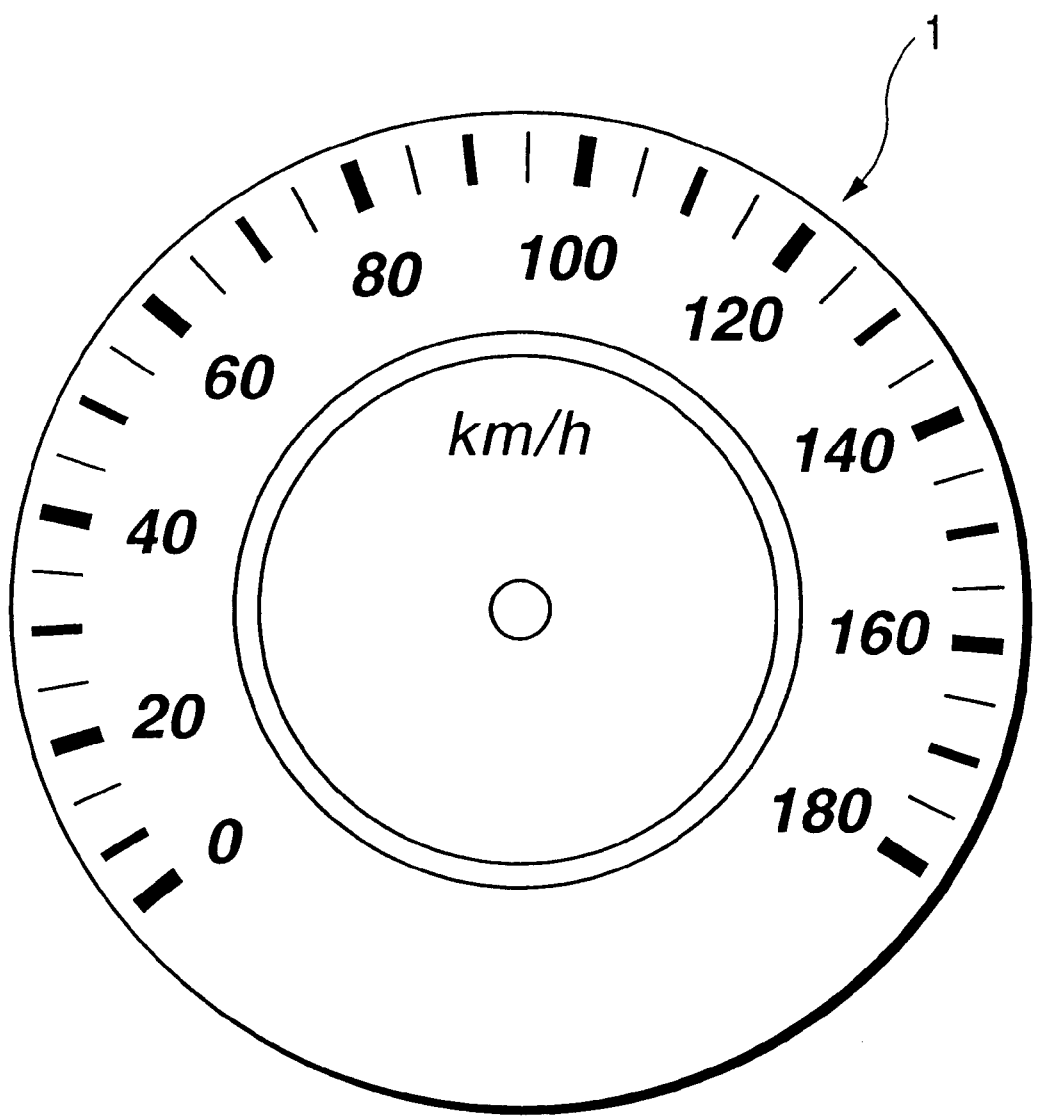
FIG. 5 is a front view showing a dial modeled utilizing conventional type computer graphics.
Figure 6:
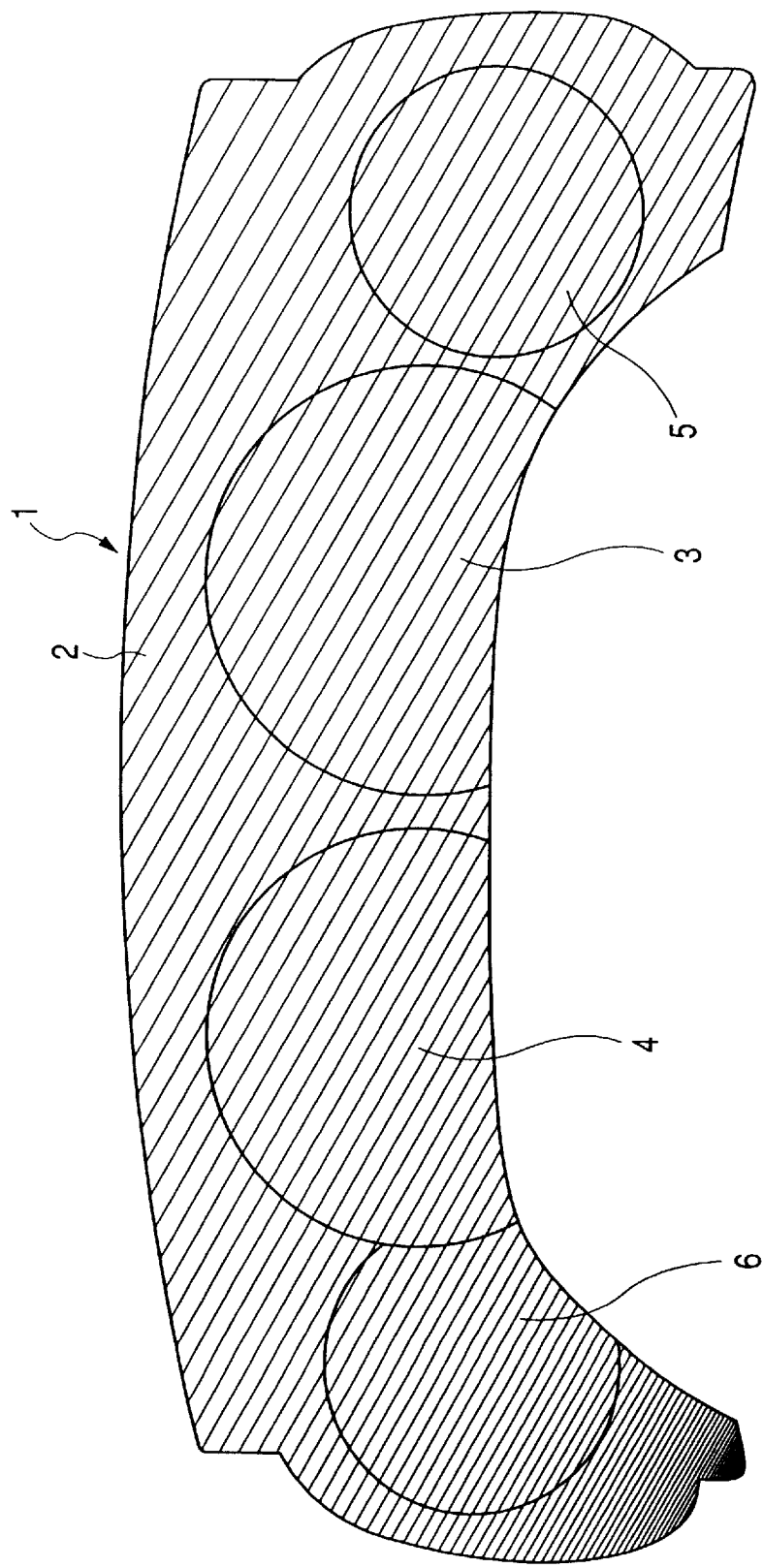
FIG. 6 is a front view showing a dial modeled utilizing conventional type computer graphics in case the dial is a combination panel.

Hereby, the dial 1 which satisfactorily looks solid shown in FIG. 4 is produced.

As described above, according to the present invention, as the three-dimensional model 7 is individually produced every meter, rendering is executed using an individual light source and the acquired two-dimensional data 9 is synthesized in case the dial 1 is a large-sized combination panel provided with the indicators 3 to 6 of plural meters such as a speed indicator, a tachometer, a fuel gage and a temperature gauge on the faced part 2, the dial 1 which enables looking solid without a sense of incompatibility can be also modeled in the case of the large-sized combination panel. Also, in the case of the large-sized combination panel and others, the dial 1 on the right and left sides of which difference between brightness and darkness is not large and which enables uniformly looking solid can be modeled.

Further, the indicator 3 to 6 of each meter looks spotlighted and the appearance can be enhanced.

In addition, stereoscopic effect produced by each indicator 3 to 6 can be freely adjusted by changing or adjusting the position of a light source every meter.

In this embodiment, the faced part 2 produces stereoscopic effect, however, it need scarcely be said that the faced part 2 may be also flat and only the indicator 3 to 6 of each meter may also produce stereoscopic effect.

Not only the indicator 3 to 6 of each meter but also a display formed on the faced part 2 of information such as warning can be made to look solid.

Referring to the drawings, the embodiment of the present invention is described above in detail, however, a specific structure is not limited to that in this embodiment and even if design is varied within the range of the outline of the present invention, the above variation is included in the present invention.

For example, the method according to the present invention can be used for modeling not only the indicators of meters for an automobile but also the indicators of meters for industrial measurement, audio, a ship, aviation and a watch.

As described above, according to the first aspect of the present invention, as the three-dimensional model of each indicator is individually produced, rendering is executed using an individual light source and the acquired two-dimensional data is synthesized in case the dial is a large-sized combination panel provided with plural indicators on the faced part, the dial which looks solid without a sense of incompatibility can be also modeled in the case of the large-sized combination panel.

In the case of the large-sized combination panel and others, the dial on the right and left sides of which difference between brightness and darkness is not large and which uniformly looks solid can be modeled.

Further, each indicator looks spotlighted and the appearance can be enhanced.

In addition, stereoscopic effect produced by each indicator can be freely adjusted by changing or adjusting the position of a light source every indicator.

According to the second aspect of the present invention, practically useful effect that the similar effect to that disclosed in the first aspect of the invention can be acquired can be produced.

What is claimed is:

1. A dial modeling device, comprising:

a three-dimensional model producing section for individually producing the three-dimensional model of plural indicators forming a dial;

a rendering section for executing rendering by specifying a different light source for the three-dimensional model of each indicator acquired in said three-dimensional model producing section, respectively projecting the data of the three-dimensional model to which said rendering is applied on a two-dimensional plane and individually generating two-dimensional data for making each indicator look solid;

an image storing section for storing the two-dimensional data of each indicator generated in said rendering section; and an image synthesizing section for synthesizing the two-dimensional data of each indicator stored in said image storing section and a faced part forming a part of the dial.

2. A dial modeling method comprising the steps of:

producing the respective three-dimensional models of plural indicators forming a dial individually;

executing rendering by specifying a different light source for the acquired three-dimensional model of each meter;

projecting the data of the three-dimensional model to which said rendering is applied on a two-dimensional plane, respectively;

generating two-dimensional data for making each indicator look solid individually; and synthesizing the acquired two-dimensional data of the indicator of each meter and a faced part forming a part of a dial.

* * * * *